Inventor
Harold Winograd
By R. J. Falkowski
Attorney

TRIGGER CIRCUIT UTILIZING UNIJUNCTION TRANSISTORS

Original Filed July 31, 1964

Inventor
Harold Winograd
By R J Falkowski
Attorney

Oct. 1, 1968 H. WINOGRAD 3,404,331

TRIGGER CIRCUIT UTILIZING UNIJUNCTION TRANSISTORS

Original Filed July 31, 1964 4 Sheets-Sheet 3

Inventor
Harold Winograd
By R J Zalkowski
Attorney

Oct. 1, 1968 H. WINOGRAD 3,404,331

TRIGGER CIRCUIT UTILIZING UNIJUNCTION TRANSISTORS

Original Filed July 31, 1964 4 Sheets-Sheet 4

Inventor
Harold Winograd
By R J Falkowski
Attorney

3,404,331
TRIGGER CIRCUIT UTILIZING UNIJUNCTION TRANSISTORS

Harold Winograd, Milwaukee, Wis., assignor to Allis-Chalmers Manufacturing Company, Milwaukee, Wis.
Original application July 31, 1964, Ser. No. 386,569, now Patent No. 3,330,998, dated July 11, 1967. Divided and this application Nov. 23, 1964, Ser. No. 413,094
8 Claims. (Cl. 323—22)

ABSTRACT OF THE DISCLOSURE

A system furnishes power for the magnetic windings of a particle accelerator from a three wave source produced by a set of generators. The magnetic windings are connected at different phase relationships to provide the appropriate power to the magnetic windings at the proper period for the required time to create the acceleration function. Mercury are rectifiers are connected to control the application of power to the windings. The mercury arc rectifiers are turned on to the required time by a group of thyratrons which are in turn basically controlled through a transformer from a group of silicon controlled rectifiers. The silicon controlled rectifiers are controlled by a trigger circuit utilizing unijunction transistors that receives the phase signals from selected portions of the power source and utilizes appropriate biasing circuits to control the timing of the operation of the trigger circuit. The unijunction transistors turn on at the appropriate desired time relative to their controlling phase input depending on the bias selection to, in turn, gate on the silicon controlled rectifier and to the mercury arc rectifiers.

This application is a divisional application of my co-pending application, Controlled Rectifier Control Means, Serial No. 386,569, filed July 31, 1964, now U.S. Patent 3,330,998.

This invention relates to control currents for triggering switching devices, particularly to trigger circuits that produce a pulse at a particular time in a cycle of an alternating control signal.

This invention provides means for producing a triggering signal to a controlled rectifier or similar switching device in response to a sinusoidal or other varying control signal. It provides for greater accuracy in producing the trigger signal by producing a pulse or sufficient magnitude to positively trigger a controlled switching device. Particularly, this invention enables a control signal to be of a smaller amplitude for a given desired accuracy.

The objects of this invention are to provide a new and improved means for producing a pulse in response to a varying control signal; to provide triggering means that are accurate in operation and practical in application; to provide triggering means that provide current pulses of sufficient magnitude to assure accurate firing of a triggering device such as, for example, a silicon controlled rectifier; and to provide triggering means capable of producing current pulses having a steep leading edge from an alternating source of relatively low magnitude.

Other objects and advantages will become apparent from the following detailed description of an embodiment of this invention.

Figure 1:
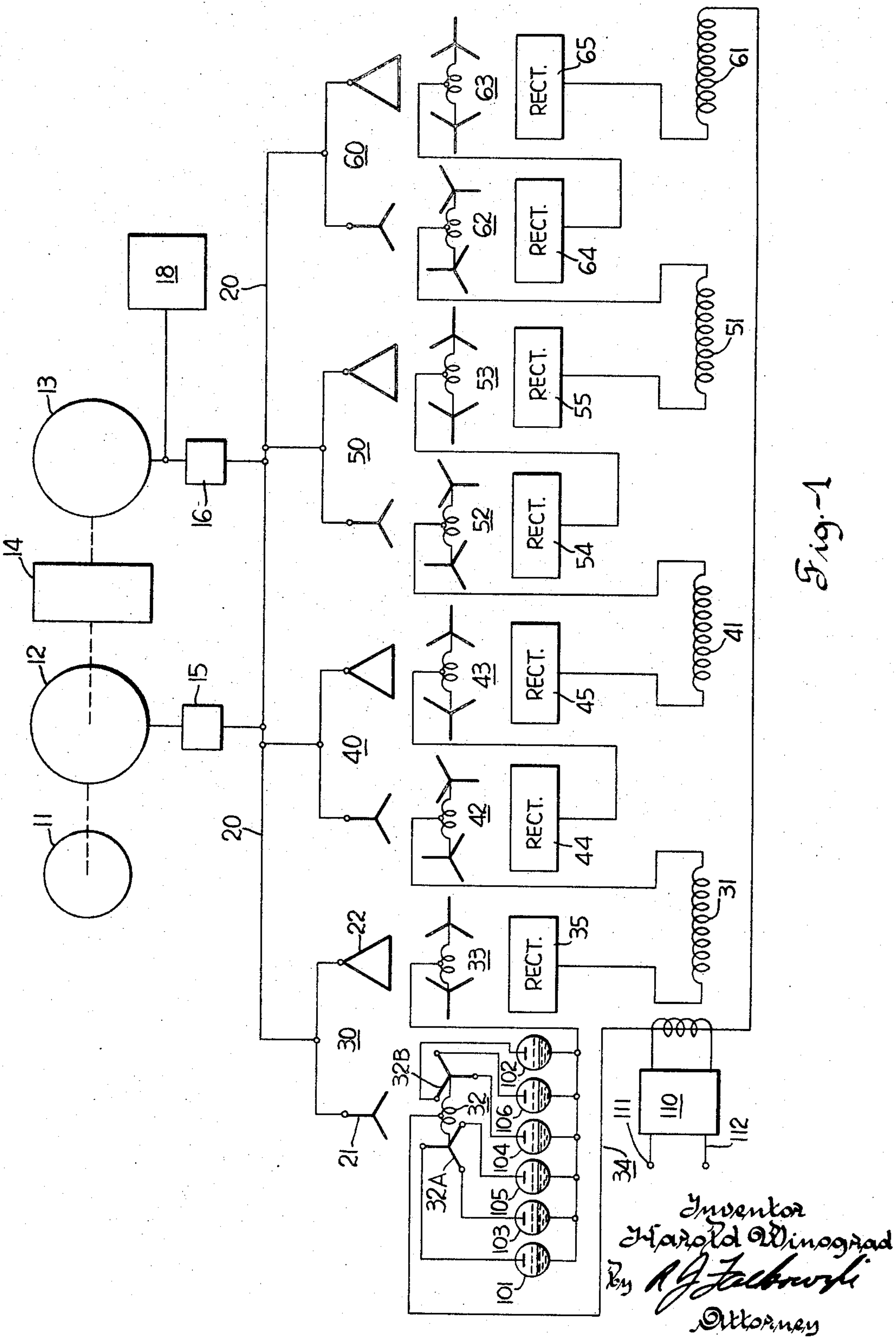
FIG. 1 is a drawing illustrating a power source, magnet windings and rectifier sections of a particle accelerator system with one of the rectifier sections shown in detail.

Referring to FIG. 1, a motor generator system having two parallelly connected synchronous generators 12 and 13, and a flywheel 14 are driven by a motor 11 to provide electrical energy to an alternating current bus 20 through circuit breakers 15 and 16. Bus 20 is connected to four sets of wye and delta connected primary windings of four transformer groups 30, 40, 50 and 60. Each of the primary windings, such as windings 21 and 22, is coupled to a six phase secondary winding, such as windings 32A and 32B, that is connected to a rectifier section. A twelve phase output is obtained from each group and the associated rectifier sections because of the phase displacement between each transformer group, such as windings 32 and 33 of group 30. Magnet windings 31, 41, 51 and 61; rectifier sections 34, 35, 44, 45, 54, 55, 64 and 65; and secondary winding systems 32, 33, 42, 43, 52, 53, 62, 63 are connected in series.

Figure 2:
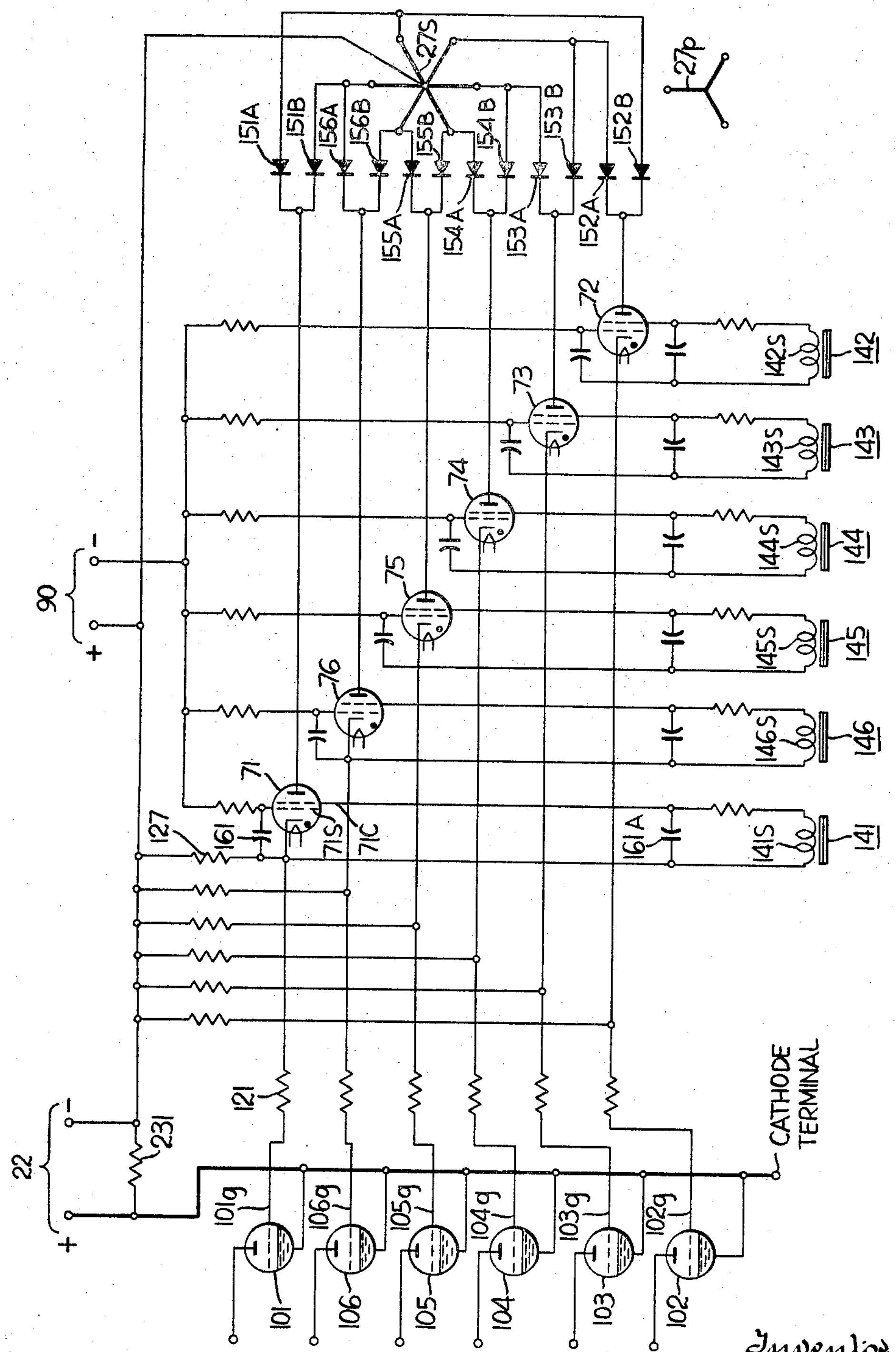
FIG. 2 is a drawing of a portion of the control means for the rectifier sections.

Rectifier section 34 is shown in detail. Each section has six controlled rectifier devices such as mercury arc rectifiers 101, 102, 103, 104, 105 and 106 each connected to a different phase of windings 32A and 32B. (The control connections of the mercury arc rectifiers are shown in FIG. 2.)

A power source 18 for the control circuits receives power from one of the generators, generator 13 and provides energy for the primary windings of the transformers and all the control circuits used in the system. The voltages applied to the control circuits from source 18 are in synchronism with the generator voltage and have a predetermined relationship to the voltages of the secondary windings of the power rectifier transformers. Power source 18 also provides the required step-down and insulating transformers and a wave filter for smoothing the voltage applied to some of the control circuits.

In the operation of a particle accelerator, it is necessary to build up and collapse the current through the magnets in the manner shown in curve *5a*. The current is increased as shown by section M, is maintained at a relatively constant level (if desired) as shown by section N, and is collapsed to zero as shown by section L.

When particles introduced into the particle accelerator are accelerated, the magnetic field increases as a function of the current to provide a centripetal force to balance the centrifugal force of the circularly moving particles. After the particles are ejected the magnetic field is collapsed as rapidly as possible.

To provide the increasing current through the magnets, the potential across the magnet windings 31, 41, 51 and 61 is raised to a maximum voltage level F as shown in curve *5b* by operating the mercury arc rectifiers as rectifiers. If a brief period of constant current such as shown by section N is desired, an intermediate voltage B is obtained by operating the mercury arc rectifiers to provide the reduced voltage. To collapse the magnet windings current to zero as rapidly as possible, the mercury arc rectifiers are operated as inverters to provide a negative voltage, voltage H, across the magnet windings. The negative voltage rapidly reduces the current, section L, curve *5a*, to zero.

The portion of the control means that provides a gating pulse to the grids of the mercury arc rectifiers is shown in FIG. 2. Controlled rectifier devices such as thyratron tubes 71, 72, 73, 74, 75 and 76 are each respectively connected to control grids 101*g* through 106*g* of the mercury arc rectifiers. The thyratrons are sequentially turned on when pulses are produced across each respective winding of secondary windings 141*s*, 142*s*, 143*s*, 144*s*, 145*s* and 146*s* of transformers 141 through 146, respectively. Power for the control grid pulses is provided by a six phase secondary winding 27*s* (the voltages of which are shown vectorially) coupled to primary winding 27*p* which is connected to derive power from power source 18 (FIG. 1). Winding 27*s* is connected to the thyratrons, as shown by diodes 151A through 156A and diodes 151B through 156B. Each thyratron is energized by two phases of winding 27*s* to assure an adequate potential level over the time that each thyratron may be fired. If necessary, additional sources derived from source 18 (FIG. 1) may be connected into this circuit to provide a longer phase related time for energization of the thyratrons.

A voltage is applied from source 22 (across a resistor 231) to negatively bias the mercury arc rectifiers to assure that they will not turn on until the gating pulse is produced. Equalizing resistors such as resistor 127 connect the control circuits of the thyratrons to a common point.

A bias 90 is applied to the secondary grids, such as grid 71*s*, of the thyratrons negatively to bias the thyratrons. Capacitors such as capacitors 161 and 161A are provided to aid in preventing triggering of the thyratrons in response to spurious signals or noise. Upon pulsing of a transformer, as for example transformer 141, a voltage pulse appears across associated secondary winding 141*s* and turns on associated thyratron 71 by making its control grid 71*c* sufficiently positive to overcome the blocking action of the negative bias from source 22 on grid 71*s*. Upon turning on of thyratron 71, current flows from winding 27*s* through diodes 151*a* and 151*b*, through thyratron 71 and through a current limiting resistor 121 to grid 101*g* to turn on mercury arc rectifier 101.

Figure 3:
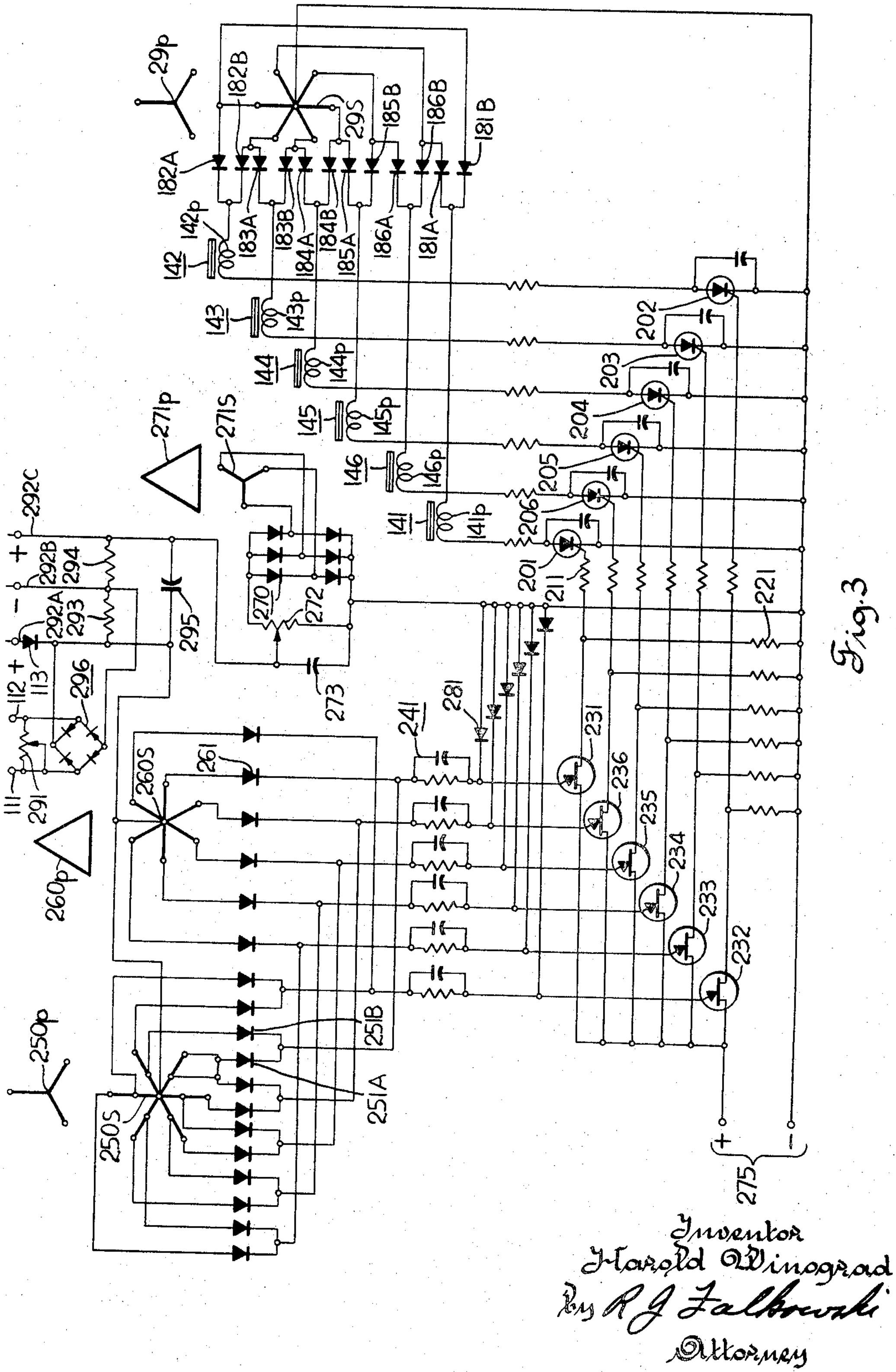
FIG. 3 is a drawing of another portion of the control means specifically illustrating the means for producing the triggering pulse.

FIG. 3 shows means for producing the timed pulses in primary windings 141*p* through 146*p* (secondary windings 141*s* through 146*s* are shown in FIG. 2) to turn on the thyratrons at selected points in the cycles of their related phases.. Switching devices such as silicon controlled rectifiers 201, 202, 203, 204, 205 and 206 are selectively turned on to sequentially connect primary windings 141*p* through 146*p* to a corresponding phase of a secondary winding 29*s* coupled to a primary winding 29*p* which is connected to receive power from source 18 (FIG. 1). Windings 29*s* is connected to the controlled rectifiers, as shown by diodes 181A through 186A and diodes 181B through 186B. Each controlled rectifier is energized by two phases of winding 29*s* to assure an adequate potential level over the time that each controlled rectifier may be turned on. If necessary, additional sources derived from source 18 (FIG. 1) may be connected into this circuit to provide a longer phase related time for energization of the controlled rectifiers.

Means for triggering the silicon controlled rectifiers are provided by switching means such as unijunction transistor 231, for connecting a control signal to the silicon controlled rectifier when the magnitude exceeds a predetermined level determined by the bias across the bases of the unijunction transistor. Also, the means for triggering comprises means for providing a low impedance for the current pulse, such as parallelly connected resistance-capacitance circuit 241.

Each of a group of unijunction transistors 231, 232, 233, 234, 235 and 236 is connected in the respective gating circuit of a related silicon controlled rectifier to provide a sharply defined gating pulse for its related silicon controlled rectifier. The unijunction transistor has one base connected to the gating or control terminal of the silicon controlled rectifier and the other base connected to the positive terminal of bias source 275. The silicon controlled rectifiers are turned on by a variably biased control signal passed through the unijunction transistor. The control signal is derived from secondary windings 250*s* and 260*s*. Windings 250*s* and 260*s* provide a control signal of varying magnitude such as a sinusoidal alternating signal that has a predetermined phase relationship to the phase of the current controlled by its associated silicon controlled rectifier. Windings 250*s* and 260*s* are coupled to primary windings 250*p* and 260*p*, respectively, which derive their energy from power source 18 (FIG. 1).

Control over the entire range of rectification and inversion is obtained by varying the rectifier direct current voltage over the complete range from maximum positive (rectification) to maximum negative (inversion). The voltage is varied over the required range by changing the phase control angle, i.e., the firing point of the mercury arc rectifiers in their respective voltage cycles over a range of nearly 180°. The firing of the mercury arc rectifier is controllable over this extended range as illustrated by angle *y* (FIG. 4*a*).

Figures 4, 5:
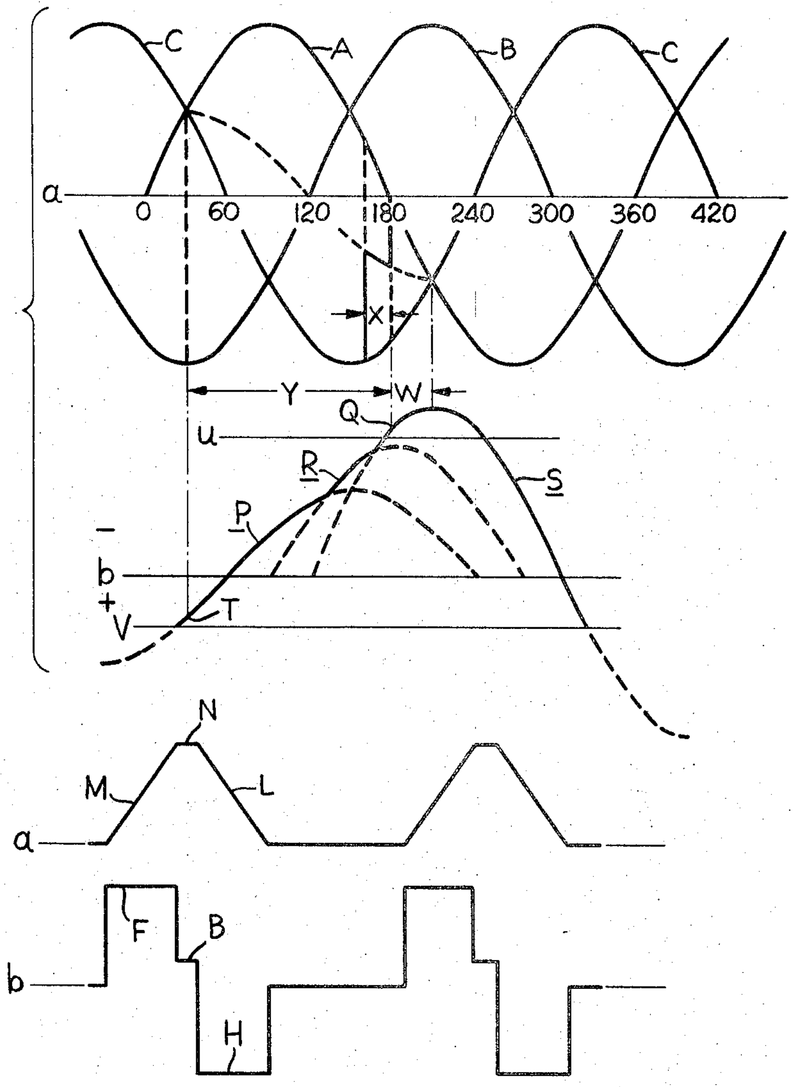
FIG. 4 is a drawing of characteristic curves that appear in the system.
FIG. 5 is a drawing of characteristic curves appearing in the magnet winding power circuit.

Referring to FIG. 4, curve 4*a* illustrates three phase voltages designated A, B and C produced by winding 32A (FIG. 1). Curve 4*b* illustrates a control signal for controlling phase A. To explain the operation of the control circuitry, a typical phase such as phase A shown in curve 4*a*, its mercury arc rectifier 101 and its associated circuitry will be particularly described.

Mercury arc rectifier 101 is controlled by the circuitry comprising thyratron 71, transformer 141, silicon controlled rectifier 201, unijunction transistor 231, R-C circuit 241, diodes 261, 251A and 251B, and the variably biased control signal derived from windings 250*s* and 260*s*. The control signal is a composite signal made up of three separate sine waves of a selected and related amplitude and a selected phase relationship. The composite wave is biased by a fixed bias appearing across a potentiometer 272 and a controlled variable bias appearing across a resistor 293. The control signal is therefore selectively biased to select the time in its cycle that it becomes positive.

Windings 250*s* and 260*s* are connected to silicon controlled rectifier 201 through diodes 251A, 251B and 261 as shown. The phase relations and magnitudes of the voltages are such that the connections through the diodes provide a composite voltage wave as shown in FIG. 4*b*. The composite wave is made of three sine waves, P, R and S, which are spaced 30° apart to provide a relatively long ramp (solid portion of curve) for furnishing a positive voltage for turning on the silicon controlled rectifier.

Sine wave P is obtained through diode 251B, sine wave R through diode 261 and sine wave S through diode 251A. Sine wave P has approximately one-half the amplitude and sine wave R has approximately three-quarters the amplitude of sine wave S.

By utilizing the sine wave combination, the time range or angle over which a relatively steep slope of substantially increasing voltage is present extends over a range of nearly 180°. When a gating voltage is derived from a single sine wave the change of voltage per unit of time near the maximum positive and negative amplitude is relatively small and the desired accuracy is difficult to achieve. The relatively steep slope and greater range of the composite wave provides a sharper voltage change and therefore greater accuracy over the expanded range for turning on the silicon controlled rectifier.

Composite voltage wave PRS is delivered through parallel R-C circuit 241. The resistance of the R-C circuit limits the current and the capacitor of the R-C circuit provides a pulse bypass. The voltage wave composite PRS and its biases are applied to the emitter of unijunction transistor 231.

Unijunction transistor 231 is biased by a source 275. When the composite wave is applied to the emitter, the unijunction transistor does not turn on until a selected proportion of the bias voltage is reached. At this point the unijunction conducts a pulse having a relatively sharp positive leading edge to the gating terminal of silicon controlled rectifier 201 through a current limiting resistor 211.

An equalizing resistor 221 connects the gating circuit to a point common to all the gating circuits. A diode 281 provides a bypass for preventing the application of any negative voltages to the unijunction transistor.

The gating circuit of the silicon controlled rectifiers is negatively biased at a fixed level by the voltage applied from potentiometer 272. This voltage provides a relative zero voltage for the sine wave illustrated in FIG. 4*b* as line *u*. The fixed bias is selected so that the sum of the voltages applied to the gating circuit of the silicon controlled rectifier provides a positive voltage (the intersection of line *u* and the compositive wave) to turn on the silicon controlled rectifier. This positive voltage is applied to the gating terminal of the silicon controlled rectifier when the voltage reaches a level high enough to turn on the unijunction transistor. This level is illustrated as point Q, the time of turning on of the mercury arc rectifier. Point Q occurs slightly after the point of intersection of wave PRS and line *u* because of the selected delay resulting from the operation of the unijunction transistor. When operation is controlled by the fixed bias the mercury arc rectifiers are turned on in their related phases to operate as inverters.

The fixed bias is taken from a secondary winding **271*s* coupled to a primary winding 271*p* which is connected to power source 18 (FIG. 1). A capacitor 273 filters the ripple of the rectified output of a full wave rectifier 270**.

A system control signal for varying the bias on the gating circuit is provided across terminals 292A and 292B which are connected to receive power from power source 18 (FIG. 1). This system control signal appears across terminals 292A and 292B to provide a relative zero voltage for the composite wave illustrated in FIG. 4*b* as line *v*. Line *v* illustrates the bias applied to the composite wave to turn on controlled rectifier 201 and provides rectification in the power circuit. The intersection of the composite wave and line *v* is the time at which the control signal becomes positive. Point T illustrates the time of firing of the mercury arc rectifier which is then operating as a rectifier. Point T is slightly delayed from the intersection because of the effect of the unijunction transistor.

Intermediate biases could be applied, if desired, to provide operation anywhere between maximum rectification and maximum invertion, for example, section B in FIG. 4*b*.

During inverter operation, it is necessary to provide for commutation and deionization time when switching on the mercury arc rectifiers. With phase A commutation and deionization must be completed before 210°, the point where phase A is no longer positive relative to phase C. Therefore, deionization and commutation time must be taken into account in determining the time of firing of the mercury arc rectifier. Deionization time is compensated for by controlling the bias illustrated by line *u* to provide a time factor equal to a margin angle *w*. Commutation time is provided by controlling the bias illustrated by line *u* to provide a time factor equal to a commutation angle *x*.

A minimum deionization time is selected for the minimum expected current conditions. Further adjustment is provided for by a current compensation means signal derived from a transductor 110 (FIG. 1), a potentiometer 291 and a full wave rectifier 296. Transductor 110, shown as a current transformer, produces an output across terminals 111 and 112 (FIGS. 1 and 3) proportional to the current in the magnet windings. A diode 113 is connected between rectifier 296 and terminal 292A to prevent feedback from the current compensation means to the system control signal source.

The current compensation means provide the current compensation signal across resistor 293. This signal is filtered by a capacitor 295 and has the effect of moving line *u* (FIG. 4*a*) downward relative to the composite wave as a function of the current through the rectifier power circuit. This moves the firing point T to the left (earlier) to provide for increases in commutation and deionization time.

The current compensation signal does not affect the bias when the bias is at some minimum positive level, as at line *v* for example, because it is applied parallel to, is of smaller value than, and has the same polarity as the variable bias during rectification operation. When the system control signal applied across resistor 293 from terminals 292A and 292B is positive, the positive potential of the current compensation signal from rectifier 296 has no effect. This is the situation for rectifier operation. However, when the system control signal is less positive than the current compensation signal from rectifier 296, the current compensation signal affects the bias on the gating circuits. This is the situation for inverter operation.

The firing time at point T, point Q or any intermediate point, is controlled by the fixed bias, the system control signal, the composite voltage wave and the current compensation signal when it is effective. The current compensation signal advances the firing from point T by an angle *x* to allow for commutation of the current and deionization of the rectifier.

A blocking signal may be provided, if desired, to make the control circuit ineffective by applying a large negative bias to the gating circuits from *u*, a point 292C (FIG. 3). This voltage appears across a resistor 294 and has the effect of moving line *u* (FIG. 4*b*) above the composite wave so that the sum of the voltages is never positive and the silicon controlled rectifiers are never turned on.

In describing the invention, the preferred embodiment has been shown and described, but it is obvious to one skilled in the art that there are many variations, combinations, alterations, and modifications that can be made without departing from the spirit of the invention, or from the scope of the appended claims.

The embodiments of the invention in which an exclusive property or privilege is claimed are defined as follows:

1. Means for triggering a silicon controlled rectifier having a gating terminal by delivering to said gating terminal a positive current signal derived from an alternating source to trigger said rectifier at a preselected point in the cycle of said source, said means comprising:

- means responsive to the alternating source for producing an alternating control ramp signal having a rising slope and preselected phase relationship to said source and including means for generating a plurality of sine waves spaced apart in phase and being of successively increasing amplitude,
- a unijunction transistor having two base electrodes and an emitter electrode with one of said base electrodes connected to said gating terminal,
- a parallelly connected resistance-capacitance circuit connected in series with the control signal producing means and the emitter electrode, said resistance-capacitance circuit selected to provide a low impedance to the control signal,
- means for applying a fixed DC reverse bias through said resistance-capacitance circuit to said unijunction transistor to normally determine the point in the cycle that said control signal triggers said unijunction transistor, and
- means for selectively applying a DC forward bias through said resistance-capacitance circuit to said unijunction transistor so that said control circuit triggers said unijunction transistor earlier in the cycle.

2. A system for controlling electrical current between an alternating power source and a load comprising:

- a controlled switching device having a control terminal and connected to control electrical current between the source and the load,
- means responsive to the power source for producing an alternating control ramp signal having a rising slope and preselected phase relationship to the source and including means for generating a plurality of sine waves spaced apart in phase and being of successively increasing amplitude, and means for delivering a triggering signal to the control terminal of the switching device comprising a unijunction transistor having two base electrodes and an emitter electrode with said emitter electrode connected to receive said control signal and with one of said base electrodes connected to the gating terminal, means for applying a fixed DC reverse bias to said unijunction transistor, whereby said control signal normally triggers said unijunction transistor late in the cycle, and means for selectively applying a DC forward bias to said unijunction transistor so that said control signal triggers said unijunction transistor earlier in the cycle.

3. A sytem for controlling electrical current between an alternating power source and a load comprising:

a silicon controlled rectifier having a gating terminal and connected to control electrical current between the source and the load, means for producing an alternating control ramp signal having a rising slope and a preselected phase relationship to the source voltage and including means for generating a plurality of waves spaced apart in phase and of successively increasing amplitude, means for delivering a positive pulse to the gating terminal comprising a unijunction transistor having two base electrodes and an emitter electrode connected to receive the control signal, a parallelly connected resistance-capacitance circuit with said resistance-capacitance circuit connected in series with said emitter electrode and said means for producing the control signal and with one of said base electrodes connected to the gating terminal, means to apply a fixed DC reverse bias to said unijunction transistor, whereby said control signal normally triggers said unijunction transistor late in the cycle, and means for selectively applying a DC forward bias to said unijunction transistor so that said control signal triggers said unijunction transistor earlier in the cycle.

4. A system for controlling electrical current between a polyphase power source and a load comprising:

silicon controlled rectifiers each having a gating terminal responsive to a current pulse and each connected to control electrical current between a different phase of the source and the load, means for producing alternating control ramp signals each having a rising slope and a preselected phase relationship to a different phase of the source and including means for generating a plurality of waves spaced apart in phase and being of successively increasing amplitude, means for delivering a positive current pulse to each gating terminal comprising unijunction transistors each connected to receive a different control signal and each having two base electrodes and an emitter electrode, parallelly connected resistance-capacitance circuits with said means for producing the control signal connected to deliver a particular control signal through a different resistance-capacitance circuit to the emitter electrode of a particular one of the unijunction transistors and with one of said base electrodes of each of said unijunction transistors connected to a different selected gating terminal, means for applying a fixed DC reverse bias to said unijunction transistors, whereby said control signals normally trigger said unijunction transistors late in the cycle, and means for selectively applying a DC forward bias to said unijunction transistors so that said control signals trigger said unijunction transistors earlier in the cycle.

5. A system in accordance with claim 4 wherein said means for applying said fixed reverse bias and said means for selectively applying a forward bias are coupled to said emitter electrodes through said parallelly connected resistance-capacitance circuits and said means for producing control signals includes means for generating three sine waves spaced apart thirty degrees from each other and being of successively increasing amplitude.

6. A system in accordance with claim 5 wherein said means for generating three sine waves includes a pair of transformers having six phase secondary windings and a plurality of diodes connected between said resistance-capacitance circuit and certain of said transformer secondary windings.

7. A system in accordance with claim 4 and including blocking means for applying a sufficiently high unidirectional reverse bias to said unijunction transistors so that said control signals do not trigger said unijunction transistors into the conductive state.

8. A system in accordance with claim 5 and including current compensating means for varying the magnitude of said reverse bias applied to said unijunction transistors as a function of the magnitude of the current between said polyphase power source and said load.

References Cited

UNITED STATES PATENTS

| | | | |
|---|---|---|---|
| 3,260,962 | 7/1966 | Draper | 331—111 |
| 3,332,002 | 7/1967 | Jollois | 321—69 X |
| 3,281,645 | 10/1966 | Spink | 307—88.5 |
| 3,226,627 | 12/1965 | Fromkin | 323—22 |
| 3,146,392 | 8/1965 | Sylvan | 323—22 |
| 3,126,491 | 3/1964 | Rockwell | 307—88.5 |
| 3,114,098 | 12/1963 | Rallo et al. | 323—22 |
| 3,091,729 | 5/1963 | Schmidt | 307—88.5 |

JOHN F. COUCH, *Primary Examiner.*

G. GOLDBERG, *Assistant Examiner.*